Figure 1:
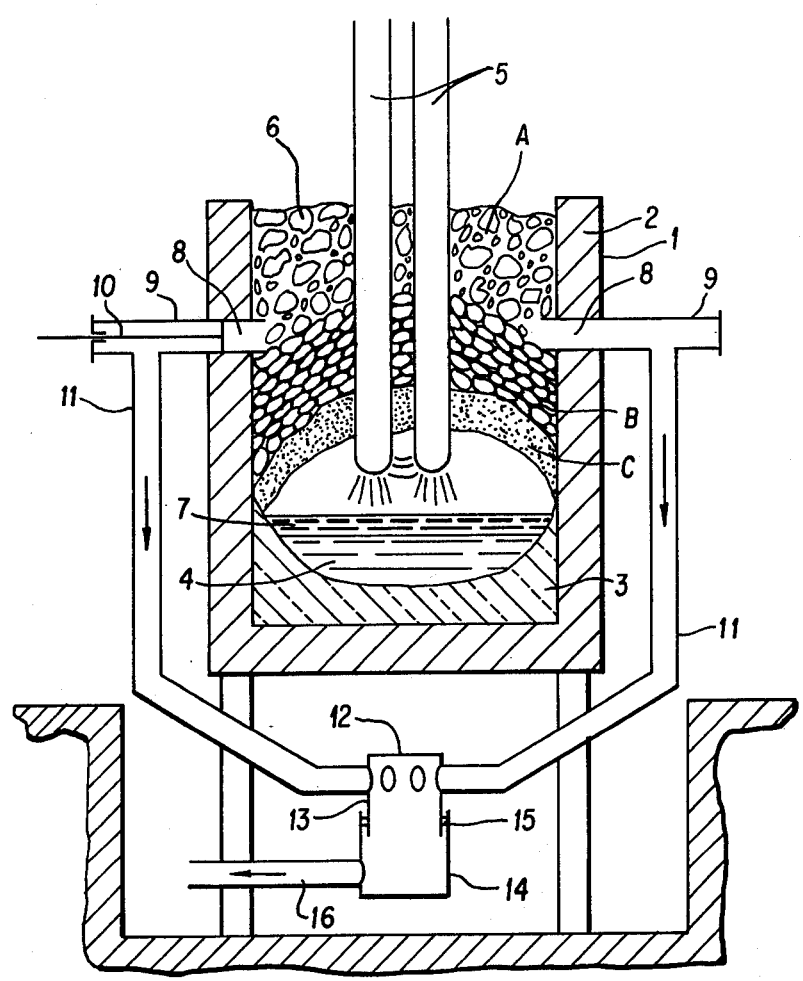

United States Patent [19]

Herold et al.

[11] 4,450,003

[45] May 22, 1984

[54] PROCESS AND APPARATUS FOR THE RECOVERY OF COMBUSTIBLE GASES IN AN ELECTROMETALLURGY FURNACE

[75] Inventors: Robert Herold; Francis Dubrous, both of Sallanches, France

[73] Assignee: Societe Francaise d'Electrometallurgie Sofrem, Paris, France

[21] Appl. No.: 438,262

[22] Filed: Nov. 1, 1982

[30] Foreign Application Priority Data

Dec. 1, 1981 [FR] France ................. 81 22881

[51] Int. Cl.³ ............... C21B 7/22; C21C 5/38; C21C 5/40
[52] U.S. Cl. ................. 75/10 R; 75/11; 266/144
[58] Field of Search ............... 75/10-12, 75/60; 266/144, 159; 13/9 R

[56] References Cited

U.S. PATENT DOCUMENTS

| | | | |
|---|---|---|---|
| 3,033,673 | 5/1962 | Collin | 75/11 |
| 3,140,168 | 7/1964 | Halley | 75/11 |
| 3,150,958 | 9/1964 | Collin | 75/11 |
| 3,163,520 | 12/1964 | Collin | 75/11 |
| 3,715,200 | 2/1973 | Archibald | 75/10 R |

*Primary Examiner*—Peter D. Rosenberg

*Attorney, Agent, or Firm*—Oblon, Fisher, Spivak, McClelland & Maier

[57] ABSTRACT

The invention concerns a process for the recovery of combustible gases in an electrometallurgy furnace comprising an external metal casing (1) and an internal refractory lining (2), in which at least one oxidized compound is reduced by means of carbon, the various components being introduced into the furnace in the form of a divided charge (6) (A) which moves progressively downwardly towards the reaction region (C), passing through a sintering region (B). The combustible gases produced in the reaction region are collected by suction, by means of a plurality of apertures (8) provided in the external metal casing (1) and the internal refractory lining (2) and disposed at a level corresponding to the lower portion of the divided charge (A) and before it passes into the sintering region (B).

Suction of the gases collected by each aperture may be controlled in dependence on at least one of the following parameters: temperature, pressure and flow rate of the gases, and concentration of carbon monoxide, nitrogen or other component in the gases. The gases collected at each aperture (8) are passed to a central collector (12) and directed as desired towards a storage means for deferred use, or towards a means for immediate use.

At least 60% of the energy introduced into the furnace may be recovered.

10 Claims, 1 Drawing Figure

PROCESS AND APPARATUS FOR THE RECOVERY OF COMBUSTIBLE GASES IN AN ELECTROMETALLURGY FURNACE

The present invention concerns a process an apparatus for the recovery of combustible gases and more particularly carbon monoxide in an electrometallurgy furnace.

Many processes for the electro-thermal production of metals and alloys involve a stage comprising the reduction of an oxidised compound by carbon in an electric arc furnace, with correlated production of a substantial amount of carbon monoxide which is burnt in the upper part of the charge. This is the case in particular with the production of silicon, alloys based on silicon, chromium and manganese, and in the production of calcium carbide.

The need to save energy in such manufacturing operations, and also to improve the operating conditions in the environment of the furnace gave rise to the idea of collecting and recovering the emitted gases, which are at elevated temperature and which contain a proportion of carbon monoxide that may vary depending on the manufacturing procedures but that is generally sufficient to justify the recovery operation and make it a viable proposition.

The attempt has already been made to collect the gases, as mentioned above, by integrally closing off the furnace, in particular for the production of ferrosilicon. Such arrangements are described, inter alia, in U.S. Pat. Nos. 3,213,178 (ELKEM), 3,163,520 (ELKEM), 3,615,346 and 3,679,806 (DEMAG) and French Pat. No. 2 431 546 (JAPAN DETALS). However, integrally sealing the furnace in the above-indicated manner gives rise to very severe constraints in regard to all operations involving loading the raw materials into the furnace, monitoring operation of the furnace and the downward movement and distribution of the furnace charge, and operating on the electrodes, and also in regard to the operating life and performance of the furnace arch which is subjected to the direct action of the flames.

Sealing off the furnace in the above-indicated manner is often impractical in regard to an existing furnace, and it puts a burden that is often dissuasive on the construction specification of a new furnace.

U.S. Pat. No. 4,005,252 (ELKEM) describes an apparatus for collecting the gases which are emitted by an open furnace, comprising an annular member which is disposed in the upper part of and inside the furnace, on the one hand, and the bath member or crucible of the furnace, on the other hand, the two members which are movable relative to each other being connected by a sealing joint. In the part thereof which is disposed within the furnace, the gas collection arrangement is formed by an inclined sealing partitioning wall which necessarily extends into the furnace charge to a depth which is normally attained by the level of the ends of the electrodes. Hydraulic means are provided for rotating the arrangement with respect to the bath crucible. This arrangement is relatively complicated, and the reliability and efficiency thereof are open to question, in consideration of its position relative to the furnace charge and the electrodes.

The present invention seeks to overcome the problem of collecting combustible gases, by a novel, simple, efficient and reliable means.

A first object of the present invention is a process for the recovery of combustible gases in an electrometallurgy furnace comprising an external metal casing and an internal refractory lining, in which at least one oxidised compound is reduced by means of carbon, the different components being introduced in the form of a divided charge which progressively moves downwardly towards the reaction region, passing through a sintering region, in which process the combustible gases produced in the reaction region are collected by suction, by means of a plurality of apertures provided in the external metal casing and the internal refractory lining and disposed at a level corresponding to the lower portion of the charge before it passes into the sintering region.

Another object of the invention is an apparatus for carrying out the combustible gas recovery process, comprising a plurality of apertures disposed in the external metal casing and the internal refractory lining, each aperture being connected to a duct which opens to the exterior of the external metal casing and which is connected to a gas suction means.

The invention was specially designed for entirely open furnaces, but it will be seen that there is nothing to prevent its being carried into effect in closed or semi-closed furnaces.

FIG. 1 is a diagrammatic view in vertical section of a furnace provided with the apparatus according to the invention.

The furnace comprises an external metal casing 1, and a refractory lining 2 which is completed, if appropriate, depending on the type of manufacture envisaged, by a carbonaceous lining 3 in the lower portion which is in contact with the liquid metal 4.

The tap hole and lip are not illustrated. Current is supplied by the electrodes 5 of which there may be any number, depending on the type of furnace.

In normal operation, the charge 6 which is essentially formed by a mixture of oxidised ore, carbonaceous reducing agent (coal, wood charcoal, coke, wood etc. . .) and possibly additive materials such as lime to form a slag with the components of the ore, and scrap material or iron ore if an iron alloy is being produced-comprises a plurality of regions, considered in a downward direction:

1. region A, being the 'cold' charge, which is in the course of being pre-heated by heat conduction and, when the present invention is not being employed therein, by surface combustion of gases and in particular carbon monoxide produced by carbo-thermic reduction reactions in region C;

2. region B in which the increasing temperature, which reaches and exceeds about 1000 to 1200° C., causes the commencement of 'sintering' of the charge, because of progressive softening of the more fusible components thereof, and 3. region C, being the reaction region in the true sense, which is directly subjected to the radiant effect of the arc and in which occur the main part of the reactions resulting in the metal which collects at 4, with possibly a layer of slag 7 thereabove, such reactions also resulting in the formation of carbon monoxide.

The applicants have found that it was possible to collect the major part of the reacting gases by disposing a plurality of apertures which open into the charge, at the periphery of the furnace, at a level which is substantially at the transition between regions A and B, and performing a suction operation through such apertures in order to extract the above-mentioned gases and carry them to means for recovery and immediate or deferred use.

The collecting apertures 8 may open flush with the surface of the refractory lining or may slightly project or bet set slightly back therein. It is preferable to provide means for ensuring that the components of the charge do not have a tendency to pass into the collecting apertures, by suitably adapting either their shape and orientation, or the geometry of the refractory lining 2 in the part which is above the apertures. The number and size of the apertures 8 and the total cross-section of the apertures must be adapted to the geometry of the furnace.

It is conceivable for the gas collecting action to be performed by a continuous ring surrounding the furnace, but that has the disadvantage of weakening the structure of the furnace at he level of the ring.

In a particular embodiment, taking a 120 kW test furnace for the production of metal silicon, the arrangement provided twelve equally spaced apertures with a rectangular cross-section measuring 140×60 mm, with the long side being horizontal, representing 75% of the inside surface area of the refractory lining at that level.

It is also preferable for means such as the clinker bar 10 to be disposed in the ducts 9 which connect to the apertures 8 for possibly unblocking the apertures either manually or automatically in dependence on a preestablished program or independence on measurement in respect of delivery rate or pressure, indicating the need for that operation.

The ducts 9 are connected by a pipe 11 to a central collector 12 disposed on the axial centre line of the furnace. That is not an obligatory arrangement, but it has the double advantage of a similar pressure drop in the different circuits leading to the different apertures, and permits the arrangement to be easily adapted to a furnace which is rotated about its axis, by making the collector 12 in two parts, an upper part 13 which is fixed with respect to the furnace and a lower fixed part 14, with a rotary seal 15 between the upper and lower parts 13 and 14, the fixed part 14 being connected to the gas suction means (not shown).

It is also possible for means for controlling the suction flow rate to be provided on the ducts 9 or 11. Such control means may go down to complete closure of the ducts and may be controlled in dependence on a number of parameters such as the flow rate, pressure, temperature, and proportion of a given component in the gas which is subjected to the suction action.

The fact that the gas suction means in the apparatus according to the invention are set in operation can be visibly detected by a progressive reduction in the size of the flames in the upper part of the furnace charge.

In a furnace intended for the production of metal silicon, the composition of the gases collected was within the following limits:
CO: 90–95%
$CO_2$: 1–2%
$N_2$: 3–7%
with in addition small amounts of oxygen, methane and higher homologues, hydrogen and water vapour.

The rate of recovery of carbon monoxide, with respect to the calculated theoretical amount, is at least equal to 60% and readily attains 70% and even higher.

If the suction action is increased, the flames completely disappear at the surface of the furnace charge, but analysis of the gas shows that the proportion of CO has fallen somewhat, and the proportion of nitrogen has increased, which shows that a little outside air was sucked in, through the furnace charge.

Therefore, depending on the thickness of the charge and its permeability, there is an optimum suction level that the man skilled in the art will be readily able to determine, for example by measuring the suction flow rate and the proportion of CO and $N_2$ in the gases which are sucked away.

The combustible gas which is recovered in the above-indicated manner can be used by any known process, immediately or after a period of deferrment, and in particular:

For prehating or prereducing the components of the furnace charge before they are introduced into the furnace, For performing various metallurgical operations which involve use of a reducing gas, For producing, in a boiler, steam for driving an electrical generator, and For supplying a gas turbine which is coupled to an electrical generator.

Use of the invention achieves a certain number of advantages:

1. In the design of the furnace:

Apart from the addition of the collection apertures and the ducts, the furnace is unmodified and the invention can be used in existing furnaces, at the cost of relatively minor modifications.

2. In operation of the furnace:

The gas suction effect reduces the surface temperature of the furnace. Because the combustible volatile substances and CO no longer burn at the surface, the amount of radiant heat is greatly reduced, resulting in a substantial improvement in the operating conditions and a longer service life for the equipment (electrode carriers, operating machinery). In addition, the furnace charge has less tendency to stick and moves downwardly in a more regular fashion.

Added to the above are all the conventional advantages of open furnaces: ease of raking, ease of equalising the charge which is locally supplied by a loading hopper, ease of recovering the butts of electrodes, and permanent visual monitoring, this being an aspect on which the operating personnel still place very great importance, all these being factors which are no longer enjoyed in closed furnaces.

Operation of the furnace is not detrimentally affected by collecting the combustible gases.

3. In the recovery of energy:

By combustion of the above-mentioned gas, depending on the type of manufacture, it is possible to recover:

in thermal form, at least 60% (and more) of the electrical energy introduced, or in electrical form, up to 20% of the electrical energy introduced.

The gases collected are relatively clean and do not carry a great deal of dust. They are at relatively low temperature (100 to 200° in the collector 12), in contrast to what happens in semi-closed furnaces in which the combustion gases issue at elevated temperature, which involves the provision of dust-removing installations that are capable of withstanding that temperature, and inseparability of the 'dust removal' and 'heat recovery' functions, which is a very troublesome situation if one of those pieces of equipment breaks down.

It should be emphasised however that the invention could also be applied to closed or semi-closed furnaces, without the disadvantages just indicated above, in particular because of the low temperature of the upper portion of the furnace charge (which deals with the problem of service life of the arch), and because the gases are collected before combustion and therefore at a relatively low temperature.

We claim:

1. A process for the recovery of combustible gases in an electrometallurgical furnace, said furnace comprising an external metal casing and an internal refractory lining, in which at least one oxidized compound is reduced by means of carbon, the different components being introduced into the furnace in the form of a particulate charge which progressively moves downward towards a reaction region, passing through a sintering region, said process comprising:

collecting the combustible gases produced in the reaction region by suction, by means of a plurality of apertures provided in the external metal casing and internal refractory lining and disposed at a level corresponding to the level of the charge immediately above said sintering region.

2. An apparatus for the recovery of combustible gases in an electrometallurigical furnace, said furnace comprising an external metal casing and an internal refractory lining, in which at least one oxidized compound is reduced by means of carbon, the different components being introduced into the furnace in the form of a particulate charge which progressively moves downward towards a reaction region, passing through a sintering region, said apparatus further comprising:

a plurality of apertures (8) which are provided in said external metal casing (1) and said internal refractory lining (2) and which are disposed at a level corresponding to the lower portion of said particulate charge before it passes into the sintering region, each aperture being connected to a duct (9) which opens to the exterior of the external metal casing (1) and which is connected to combustible gas suction means and means for the immediate or differed use of the combustible gases.--

3. A process according to claim 1 characterised in that suction of the gases collected by each aperture is controlled in dependence on at least one of the following parameters: temperature, pressure and flow rate of the gases, and concentration of carbon monoxide, nitrogen or other component in the gases.

4. A process according to claim 1 or claim 2 characterised in that the gases collected at each aperture are passed to a central collector and directed as desired to a storage means for deferred use or to a means for immediate use thereof.

5. Apparatus according to claim 2 characterised in that each duct (9) is provided with a means (10) for unblocking the corresponding aperture (8).

6. Apparatus according to one of claims 2 or 5 characterised in that each duct (9) is connected to a collector (12) by a pipe (11).

7. Apparatus according to claim 6 characterised in that the collector (12) is disposed on the vertical axis of the furnace and that the ducts (9) and the pipes (11) produce a substantially equal pressure drop in the flow of gases therethrough.

8. Apparatus according to claim 6 or claim 7 characterised in that the collector (12) is in two parts (13, 15) which are connected by a rotary joint (14), when the bath portion of the furance rotates about its axis.

9. Apparatus according to any one of claims 5 to 7 or 12 characterised in that each duct (9) or each pipe (11) has an individual means for controlling the flow rate of collected gases.

10. Apparatus according to claim 9 characterised in that the means for controlling the flow rate of collected gases are connected to a control means for control in dependence on at least one of the following parameters: temperature, pressure and flow rate of the gases, and concentration of carbon monoxide, nitrogen or other component therein.

* * * * *